United States Patent [19]

Huang

[11] 4,186,671

[45] * Feb. 5, 1980

[54] FLUID INJECTION SOIL OPENER FOR PLANTERS

[76] Inventor: Barney K. Huang, 5108 Kaplan Dr., Raleigh, N.C. 27606

[*] Notice: The portion of the term of this patent subsequent to Sep. 5, 1993, has been disclaimed.

[21] Appl. No.: 479,619

[22] Filed: Jun. 17, 1974

[51] Int. Cl.² .............................................. A01C 11/00
[52] U.S. Cl. ............................................ 111/2; 111/6
[58] Field of Search .................. 111/2, 3, 6, 99, 7; 239/426, 101

[56] References Cited

U.S. PATENT DOCUMENTS

| | | | |
|---|---|---|---|
| 2,506,430 | 5/1950 | Melvin, Jr. | 111/2 X |
| 2,930,334 | 3/1960 | Marron et al. | 111/6 |
| 3,012,526 | 12/1961 | Baldwin | 111/6 |
| 3,712,252 | 1/1973 | Huang | 111/2 |
| 3,729,137 | 4/1973 | Cobb et al. | 239/101 |
| 3,796,371 | 3/1974 | Taylor et al. | 239/101 |
| 3,815,525 | 6/1974 | Kainson et al. | 111/6 |

Primary Examiner—Stephen C. Pellegrino
Attorney, Agent, or Firm—Mills & Coats

[57] ABSTRACT

The present invention relates to a fluid injection soil opener adapted for use in conjunction with a transplanter or seed planter to form spot cavities or a continuous furrow in the soil for receiving plants or seeds therein. Fluid, preferably water, is pressurized and timely emitted in a jet-like stream towards the soil, the jet-like stream of fluid or water impinges and penetrates the soil and creates the plant or seed receiving furrow or cavity therein.

6 Claims, 4 Drawing Figures

FLUID INJECTION SOIL OPENER FOR PLANTERS

The present invention relates to soil openers for planters, transplanters, seeders or the like, and more particularly to a soil opener system utilizing fluid under pressure to create plant or seed receiving openings within the soil.

BACKGROUND OF THE INVENTION

In conventional transplanters and seed planters, there is normally provided a soil opener for opening the soil to receive plants or seeds. Typically, such soil openers have been of the direct mechanical displacement. Moreover, individuals have in the past recognized the advantage that would be offered by a "spot" opener, i.e., a soil opener that would form spaced apart cavities in the soil as opposed to a continuous furrow opening. However, an economical and reliable spot opener design has not been commercially developed to date. In the case of both the furrow and spot openers, the designers have used a direct mechanical structure to engage the soil and to displace the same in the formation of the plant or seed receiving furrow or cavity. By a direct mechanical structure one refers to a plow-like device for continually opening a furrow in the soil or a spot displacement device that is designed to physically engage the soil and remove or displace the soil at various row spacing intervals.

This direct mechanical ground engaging type of design that has been so prevalent in the design of transplanters and seed planters of the past has necessarily placed certain limitations on the efficiency and capacity of such transplanters and seed planters. Principally, the direct mechanical soil engaging design does not lend itself to high speed, high capacity automatic planting that could be achieved with an automatic transplanter of the basic design shown in U.S. Pat. No. 3,446,164. In addition, the utilization of direct mechanical structure to engage the soil, especially in the case of a furrow opening design, consumes substantial power from the propelling system plus encounters difficulty in rough and rugged terrain particularly where stumps and the like may be present such as in a forestry transplanting operation.

SUMMARY OF THE INVENTION

The present invention presents a novel type of soil opener and basically entails the utilization of a fluid, preferably water, under pressure to impinge and penetrate the soil planting medium and to create therein an opening for receiving a plant or seed.

More particularly, the fluid injection soil opener of the present invention is capable of opening both a continuous furrow or to intermittingly actuate to form spaced apart spot cavity openings within the soil. In practice, the fluid injection opener of the present invention is designed and adapted to be utilized in conjunction with a planter such as a transplanter or seed planter.

As an additional advantage, the fluid or water injection opener provides the necessary moisture to the soil that is required to support the seed or plant after planting. This should improve aeration and mechanical impedance around planted seeds or seedlings and, therefore, should give rise to improve seed germination and emergence. Consequently, the growing crop should mature with greater uniformity.

It is, therefore, an object of the present invention to provide a fluid injection soil opener that is adapted to work in conjunction with a planting machine.

A further object of the present invention is to provide a soil opener which can efficiently provide either a continuous opening of the furrow type or alternatively can be utilized to form spot cavity openings.

It is a further object of the present invention to provide a fluid or water injection soil opener that may easily be integrated into a planar machine and actuated in response to the actual planting operation of the machine.

Still a further object of the present invention is to provide a soil opener system that is compatible with a high speed high capacity automatic transplanter, and is particularly adapted to accommodate simultaneous multi-plant transplanting.

Still a further object of the present invention resides in the provision of a water injection soil opener that inherently contributes to an improved germination and growth environment for planted seeds and transplants.

Other objects and advantages of the present invention will become apparent from a study of the following description and the accompanying drawings which are merely illustrative of the present invention.

DESCRIPTION OF THE PREFERRED EMBODIMENT

Figure 1:
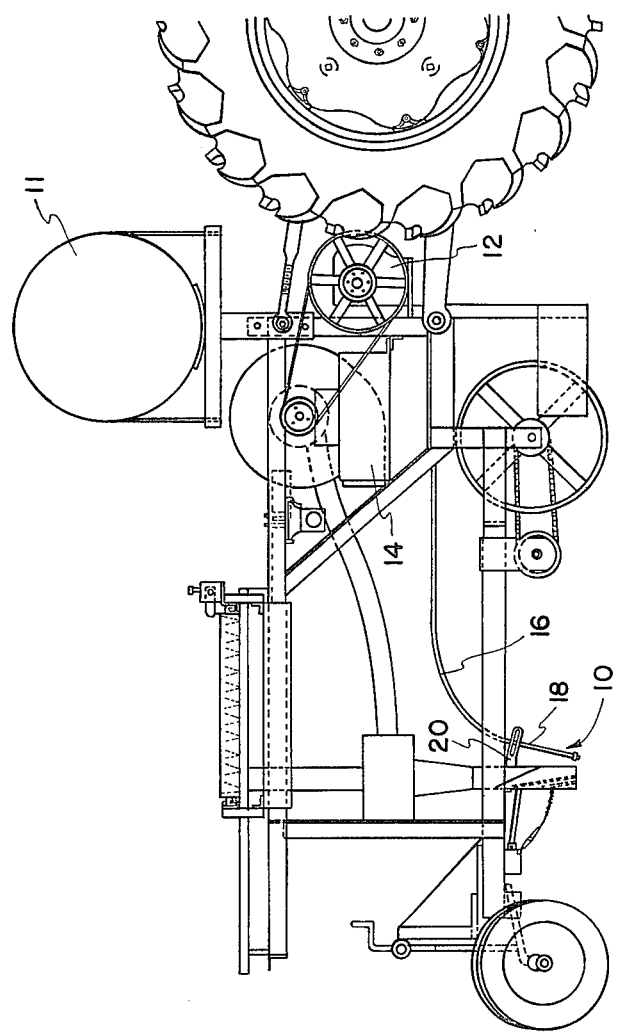
FIG. 1 is a side elevational view of an automatic transplanter having the fluid injection soil opener system of the present invention incorporated therein.

With further reference to the drawings, particularly FIG. 1, the fluid injection soil opener of the present invention is shown therein as a part of an automatic transplanter, the fluid injection soil opener being indicated generally by the numeral 10. Details of the automatic transplanter will not be discussed herein as the structure and operation of such an automatic transplanter has been published and publicly disclosed heretofore. However, the transplanter shown in the present application is contemplated to be of the same design as the automatic transplanter disclosed in U.S. Pat. No. 3,446,164, this disclosure being herein expressly incorporated by reference. In addition, such automatic transplanters are adapted to handle plants from a tray-like support structure, and, therefore, the disclosure of U.S. Pat. 3,712,252 to B. K. Huang is also herein expressly incorporated by reference. For a unified understanding of an automatic transplanting operation, these two patents are suggested for study.

Turning to a detail discussion of the fluid injection soil opener 10 of the present invention, it is seen that the same basically comprises a fluid source or water tank 11 mounted above the transplanter frame and communicatively connected to a water pump 12 which may be driven by the PTO of a tractor pulling the transplanter. Although not specifically shown, the manner of connecting the water tank 11 with the water pump 12 includes a water pipe or conduit that extends from the tank to the pump behind the frame structure of the transplanter, as viewed in FIG. 1.

From the water pump 12, the fluid is pumped into a pressure accumulator 14 which is particularly adapted to maintain a volume of the particular fluid being utilized, which is preferably water, at a predetermined pressure. It was found that a pressure of 400 psi was sufficient and satisfactory to generate either a spot cavity or a continuous furrow in the types of soil contemplated for use.

Conduit means 16 (such as rubber hosing or metal tubing) is operatively connected to the pressure accumulator 14 and leads therefrom to a pressure nozzle 18 that is supported just above the underlying ground by a bracket 20, the bracket having a slot therein that allows the position of the nozzle to be adjusted.

Figure 2:
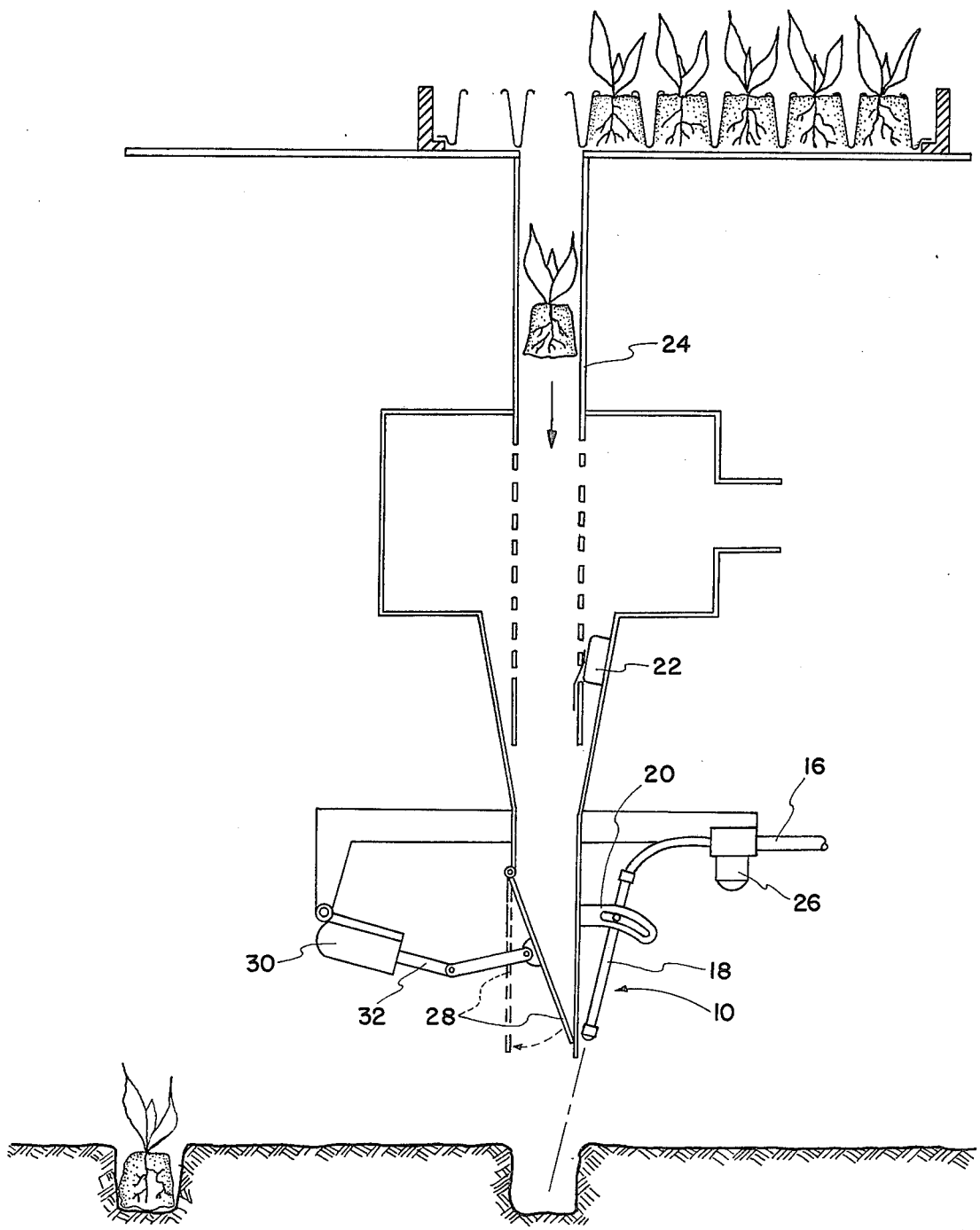
FIG. 2 is an enlarged fragmentary diagrammatic view of the nozzle portion of the fluid injection system, particularly illustrating the formation of spot cavities and the control means for actuating the fluid injection soil opener system in response to plants being dropped by the transplanter.

Turning to FIG. 2, it is seen that a micro-switch 22 is positioned within a drop tube 24 of the automatic transplanter such that the micro-switch 22 is actuated by a dropping plant as the plant passes the switch.

This micro-switch 22 is operatively connected to a solenoid valve 26 that is operatively connected in the conduit means 16 leading to the nozzle 18 and is operative to open the solenoid valve 26 and to allow fluid under pressure to pass through the conduit means into the nozzle 18 in response to a plant passing and actuating the switch. In addition, the micro-switch 22 is operative to open a hinged door 28 pivotably mounted to the bottom of the drop tube 24. In this regard, the actuation of the micro-switch 22 also actuates a second solenoid valve 30 which is operative to open the hinged door 28 through a linkage arrangement 32.

As seen in FIG. 2, the dropping plants result in the fluid injection soil opener being only intermittingly actuated, and consequently the same is operative to form spot cavities in the underlying soil as the transplanter moves over the planting medium. As each spot cavity is formed, a particular plant is passing through the drop tube 24 and because of the particular timing relationship between the plant dropping within the tube and the actuation of the micro-switch 22, it follows that the plant falls directly into the particular spot cavity being formed therefor. As with conventional planters, the automatic transplanter of the type shown herein includes a cover plate about the rear thereof which subsequent to plant dropping tends to cover the plant within the plant cavity or furrow.

Figure 3:
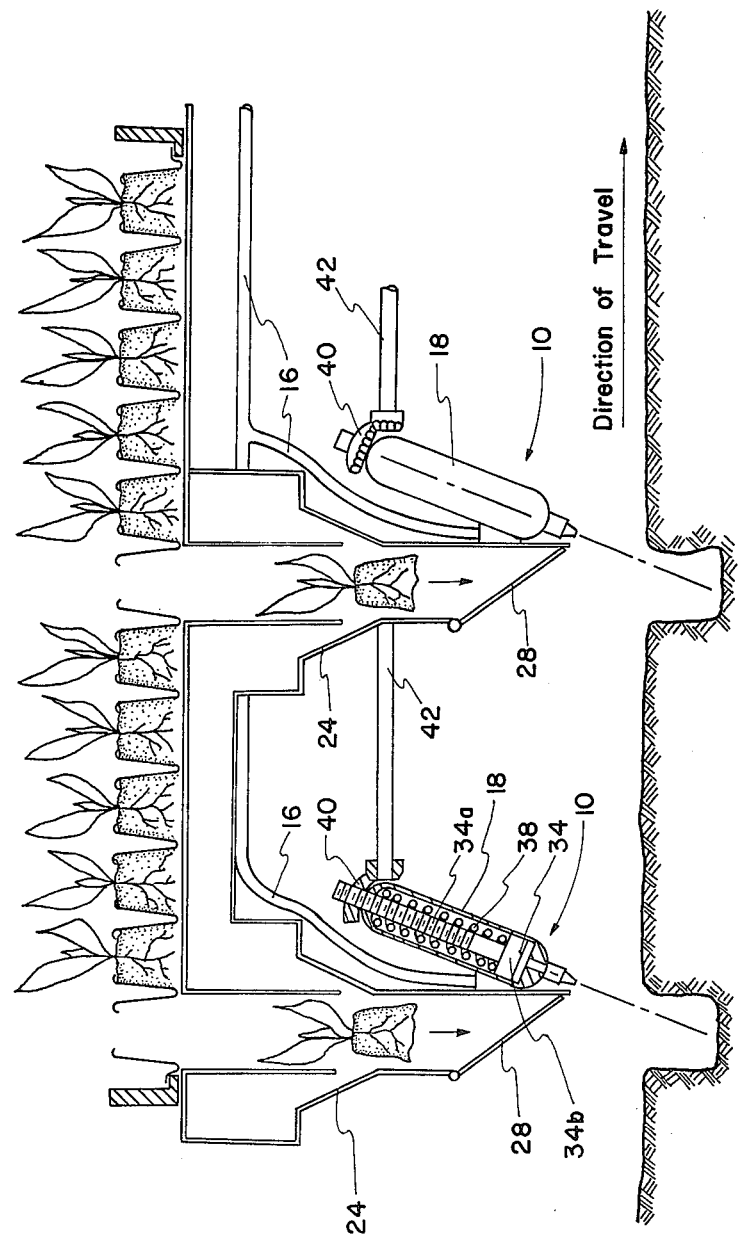
FIG. 3 is a second species of the fluid injection soil opener of the present invention, the pressure for the fluid being generated purely by mechanical means.

With respect to FIG. 3, the fluid injection opener thereof is of a purely mechanical drive type, as opposed to the electro-mechanical control type shown in FIG. 2. In the case of this species, i.e., the species shown in FIGS. 3 and 4, the nozzle housing includes a plunger 34 confined therein and having an upper threaded shaft portion 34a and a nonthreaded portion 34b integrally constructed therewith. The plunger 34 is spring biased towards the fluid exiting end of the nozzle by a compression spring 38 confined between the back side of the plunger 34 and the upper inner wall of the nozzle housing.

The threaded portion of the plunger 34a is threaded into a separable or split nut 36 that is rotatively journaled within the top of the nozzle housing and is integrally constructed with a bevel gear 40. The bevel gear 40 is in turn meshed with a second gear that is driven by a drive shaft 42 which is operatively connected to the tractor PTO or some other power generating means associated either with the tractor or transplanter.

Figure 4:
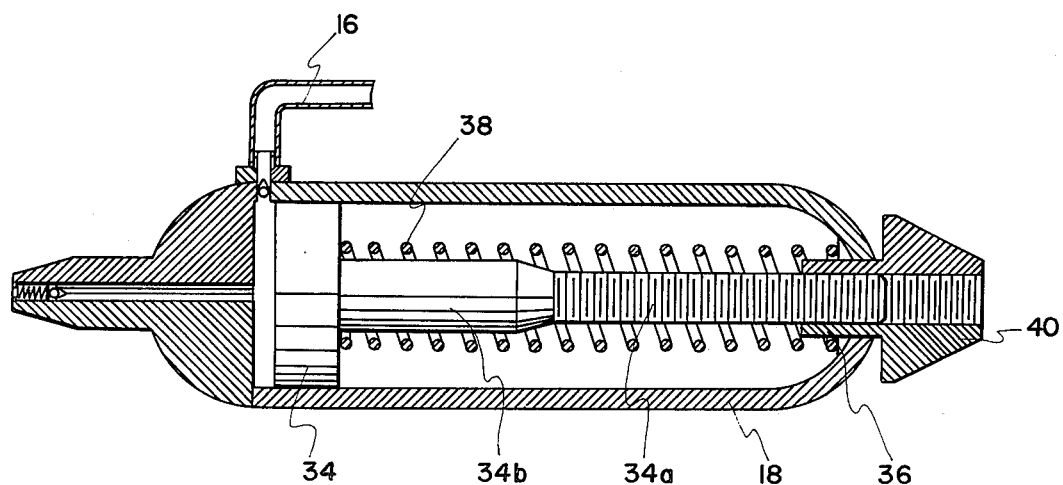
FIG. 4 is a sectional view of the nozzle shown in FIG. 3, the nozzle including a mechanical drive for actuating a plunger within the nozzle housing which acts to expel fluid therefrom under pressure.

As in FIG. 4, the nozzle 18 of the second species is adapted to receive the conduit means 16 about the lower end thereof and there is provided two conventional valves in the exiting end of the nozzle to control the flow of fluid to and from the nozzle 18.

In the case of the species shown in FIGS. 3 and 4, it is seen that the timing or time sequence of actuation of the nozzle can be controlled by the design of the mechanical parts thereof in conjunction with the speed in which the power shaft 40 is to be rotated. Also, the control could be integrated or at least related to the control mechanism of the transplanter which controls the timing of the plant dropping. But as a general proposition, the type of control contemplated for the purely mechanical system just described will usually depend and relate either directly or indirectly to the ground speed of the planter.

In the case of a seed planter, it is contemplated that in this case the fluid injection soil opener 10 would be continuously actuated to generate by fluid impingement and penetration continuous furrows in the soil for receiving the planted seeds. However, if a spot cavity opener would be desired in the case of seed planting, a photoelectric cell or some other conventional type of sensing and actuating mechanism could be used to intermittingly actuate the fluid injection soil opener in response to the actual dropping or planting of the seeds.

Therefore, it is appreciated that the basic concept disclosed herein entails the use of a pressurized fluid jet to impinge and penetrate the soil in a planting operation to open a spot cavity or a continuous furrow therein. By utilizing a fluid such as water, an improved germination and growth environment is especially provided for seeds, in the case of seed planting. Finally, the fluid injection soil opener of the present invention greatly enhances the practicality of automatic transplanters where the terrain is rough and rugged or includes stumps or other such obstacles as in the case in forestry transplanting.

The terms "upper", "lower", "forward", "rearward", etc., have been used herein merely for the convenience of the foregoing specification and in the appended Claims to describe the fluid injection soil opener for planters and its parts as oriented in the drawings. It is to be understood, however, that these terms are in no way limiting to the invention since the fluid injection soil opener for planters may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A transplanter with a fluid injection soil opener for forming plant receiving cavities in soil for the transplanter, said transplanter with a fluid injection soil opener comprising: a fluid source containing a volume of a selected fluid; fluid conduit means leading from said fluid source for channeling fluid therefrom; means for pressurizing a certain volume of said fluid from said source; nozzle means operatively connected to said conduit means for selectively directing a certain volume of fluid under pressure downwardly into the soil for forming a plant receiving cavity therein; and planting means associated with said transplanter for depositing plants in the plant receiving cavity after the cavity has been formed by said fluid injection soil opener, said planting means including timing control means for synchronizing the actuation of said nozzle means with said planting means.

2. The fluid injection soil opener system of claim 1 wherein timing control means includes means for actuating said nozzle means in response to the downward dropping movement of a plant.

3. The fluid injection soil opener system of claim 2 wherein said transplanter includes a plant drop tube and has associated therewith an electrical source and wherein said means for actuating said nozzle means in response to the downward dropping movement of a plant comprises a solenoid valve electrically connected to said electrical source and operatively connected to said nozzle means for directly actuating the same; and a micro-switch mounted within said plant drop tube and positioned therein such that said micro-switch is actuated by a passing plant, said micro-switch being further operatively connected to said solenoid valve for actuating the same in response to the actuation of said micro-switch by a passing plant.

4. The fluid injection soil opener system of claim 3 wherein said means for pressurizing a certain volume of said fluid includes a pressure accumulator operatively interconnected between said fluid source and said nozzle means, said pressure accumulator being operative to receive fluid from said fluid source and to hole the same under pressure until utilized by said nozzle means.

5. The fluid injection soil opener of claim 1 wherein said nozzle means comprises: a nozzle housing; a plunger confined within said housing; means for biasing said plunger downwardly toward the fluid exiting end of said nozzle means; and mechanical drive means for repeatedly driving said plunger away from said fluid exiting end of said nozzle and releasing said plunger which permits said plunger to move toward said fluid exiting end of said plunger housing under the influence of said biasing means, said plunger generating and expelling a system of pressurized fluid as it moves from the released position toward the fluid exiting end of said plunger housing.

6. The fluid injection soil opener of claim 1 wherein said nozzle means includes a plurality of nozzles for directing a volume of fluid under pressure downwardly into the soil for forming a plant or seed receiving cavity therein.

* * * * *